(12) United States Patent
Kracke

(10) Patent No.: US 11,022,154 B2
(45) Date of Patent: Jun. 1, 2021

(54) HYDRAULIC ACTUATOR AND MULTI-CYLINDER HYDRAULIC ACTUATOR SYSTEM

(71) Applicant: Goodrich Actuation Systems Limited, Solihull (GB)

(72) Inventor: Jeremy Kracke, Sone (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 188 days.

(21) Appl. No.: 16/059,215

(22) Filed: Aug. 9, 2018

(65) Prior Publication Data

US 2019/0055965 A1    Feb. 21, 2019

(30) Foreign Application Priority Data

Aug. 17, 2017   (EP) ..................................... 17186700

(51) Int. Cl.
  *F15B 11/22*    (2006.01)
  *F15B 13/04*    (2006.01)
  *F15B 20/00*    (2006.01)
  *F15B 9/10*    (2006.01)
  *F15B 9/12*    (2006.01)
  (Continued)

(52) U.S. Cl.
  CPC ............... *F15B 11/22* (2013.01); *F15B 9/10* (2013.01); *F15B 9/12* (2013.01); *F15B 13/0406* (2013.01); *F15B 15/202* (2013.01); *F15B 20/004* (2013.01); *F15B 2015/1495* (2013.01); *F15B 2211/405* (2013.01); *F15B 2211/421* (2013.01); *F15B 2211/71* (2013.01);
  (Continued)

(58) Field of Classification Search
  CPC ................................. F15B 11/22; B64C 13/44

USPC ..................................... 91/171, 523; 60/456
See application file for complete search history.

(56) References Cited

U.S. PATENT DOCUMENTS 2,380,975 A    8/1945   Kopp
2,675,679 A *  4/1954   Parker ..................... F03C 1/08
                                                           91/509
(Continued)

FOREIGN PATENT DOCUMENTS

EP    1157885 A2    11/2001
EP    2646673 A2    10/2013

OTHER PUBLICATIONS

Extended European Search Report for International Application No. 17186700.5 dated Jan. 26, 2018, 7 pages.

*Primary Examiner* — Michael Leslie
*Assistant Examiner* — Michael Quandt
(74) *Attorney, Agent, or Firm* — Cantor Colburn LLP

(57) ABSTRACT

A hydraulic actuator includes a hydraulic cylinder; a piston within the hydraulic cylinder and movable in response to movement of hydraulic fluid in a hydraulic circuit coupled to the hydraulic cylinder; a synchronisation connection for receiving an input from a simultaneous transmission line; and a valve for controlling the flow of hydraulic fluid in the hydraulic circuit. The valve is a rotary valve comprising: a first valve section arranged to rotate in either a first rotational direction or a second rotational direction in response to input from the simultaneous transmission line in order to open a hydraulic flow path to the cylinder and urge the piston to move along the hydraulic cylinder in a corresponding first linear direction or second linear direction; and a second valve section arranged to rotate in either the first or second rotational direction.

11 Claims, 5 Drawing Sheets

(51) Int. Cl.
  *F15B 15/20* (2006.01)
  *F15B 15/14* (2006.01)
(52) U.S. Cl.
  CPC . *F15B 2211/782* (2013.01); *F15B 2211/8752* (2013.01); *F15B 2211/8757* (2013.01)

(56) References Cited

U.S. PATENT DOCUMENTS

| | | | | |
|---|---|---|---|---|
| 3,094,010 | A * | 6/1963 | Folkerts | B62D 5/24 |
| | | | | 91/464 |
| 3,296,936 | A * | 1/1967 | Wess | F15B 11/22 |
| | | | | 91/49 |
| 3,826,328 | A * | 7/1974 | Sheppard | B62D 5/30 |
| | | | | 180/406 |
| 4,044,652 | A * | 8/1977 | Lewis | F15B 9/09 |
| | | | | 91/368 |
| 5,082,208 | A * | 1/1992 | Matich | B64C 13/505 |
| | | | | 244/78.1 |
| 6,076,767 | A | 6/2000 | Farley et al. | |
| 6,837,054 | B2 * | 1/2005 | Brocard | F15B 9/10 |
| | | | | 60/771 |
| 7,919,938 | B2 | 4/2011 | Harvey et al. | |
| 8,038,093 | B2 | 10/2011 | Gonzalez et al. | |
| 9,511,796 | B2 | 12/2016 | Ura | |
| 10,502,244 | B2 * | 12/2019 | Hervieux | F15B 13/0406 |
| 2006/0011406 | A1 | 1/2006 | Ishikawa et al. | |
| 2012/0137654 | A1 | 6/2012 | Burgess | |
| 2015/0076283 | A1 | 3/2015 | Schievelbusch et al. | |

* cited by examiner

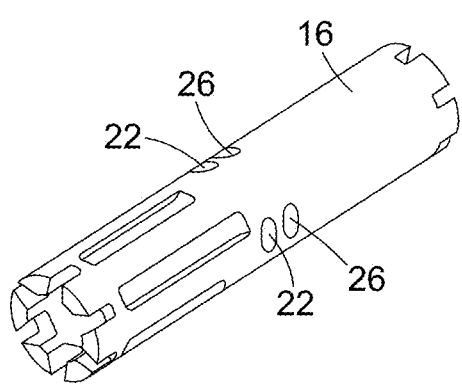 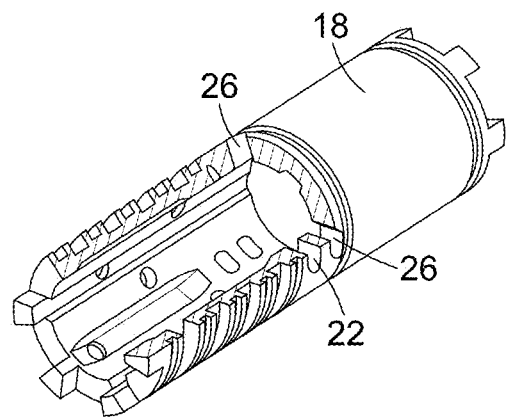
Fig. 3                   Fig. 4

HYDRAULIC ACTUATOR AND MULTI-CYLINDER HYDRAULIC ACTUATOR SYSTEM

FOREIGN PRIORITY

This application claims priority to European Patent Application No. 17186700.5 filed Aug. 17, 2017, the entire contents of which is incorporated herein by reference.

TECHNICAL FIELD

The present invention relates to hydraulic actuator and to a multi-cylinder hydraulic actuator system using the hydraulic actuator. The invention further relates to methods of operation of such a hydraulic actuator, optionally within a multi-cylinder hydraulic actuator system.

BACKGROUND

Hydraulic actuators are used in many fields and have numerous uses in aerospace in particular, for example for actuation of flight control surfaces and other moveable parts. In many cases it is desirable to have multiple hydraulic actuators spaced apart along a part to allow for a load to be applied at multiple points along the extent of the part in order to move it evenly and without undue stress on the part. In this case it is necessary to synchronise the movement of the hydraulic actuator piston rods in order to have the required movement of the part. Control of individual hydraulic cylinders via closed-loop feedback systems with appropriate sensors could achieve the required synchronisation, but this would be cumbersome and complicated. Mechanical systems have been developed for synchronisation by means of a mechanical connection between each hydraulic cylinder.

For example, in EP 2646673 an actuation system for a thrust reverser and variable fan nozzle uses multiple hydraulic cylinders where a threaded screw shaft within the cylinder is rotated by movement of the piston due to a nut mounted on the piston. A flexible synchronisation shaft joins the cylinders together and is linked to the screw shafts via a gearing system using worm wheels and worm shaft gears. In this set-up Rotation of the flexible shaft is used to synchronise movement of the pistons within the cylinders since any uneven movement will be resisted by torque induced in the shaft. U.S. Pat. No. 6,076,767 discloses another example of a multi-cylinder hydraulic actuator system with a mechanical linkage to synchronise movement of the pistons in the different cylinders. Again this uses a nut retained on a piston to link piston movement to rotation of a screw shaft, with a worm wheel and worm gear coupling a synchronisation shaft to each cylinder. The inefficiency in the worm wheel and worm gear system is used so that the torque in the synchronisation shaft is sufficient to resist differential movement between the hydraulic actuators.

SUMMARY

Viewed from a first aspect, the invention provides a hydraulic actuator comprising: a hydraulic cylinder; a piston within the hydraulic cylinder and movable in response to movement of hydraulic fluid in a hydraulic circuit coupled to the hydraulic cylinder; a synchronisation connection for receiving an input from a simultaneous transmission line; and a valve for controlling the flow of hydraulic fluid in the hydraulic circuit; wherein the valve is a rotary valve comprising: a first valve section arranged to rotate in either a first rotational direction or a second rotational direction in response to input from the simultaneous transmission line in order to open a hydraulic flow path to the cylinder and urge the piston to move along the hydraulic cylinder in a corresponding first linear direction or second linear direction; and a second valve section arranged to rotate in either the first rotational direction or the second rotational direction; wherein the second valve section is coupled to the piston such that movement of the piston results in movement of the second valve section to follow the first valve section and to close the hydraulic flow path when the rotation of the first valve section is stopped.

Thus, with this arrangement an input via the synchronisation connection can be used to open a fluid flow path through the hydraulic circuit by rotation of the first valve section in order to provide hydraulic pressure to move the piston. A relatively small input force applied via the synchronisation connection can therefore prompt a large force to be applied through the hydraulic actuator. Since movement of the piston of the hydraulic actuator is linked to movement of the second valve section then the second valve section may rotate to follow the first valve section. Thus, the second valve section is rotated in the same rotational direction as the first valve section due to movement of the piston that is prompted by the initial rotation of the first valve section. When there is no longer an input force via the synchronisation connection then the first valve section will cease rotation and the second valve section will continue to rotate to catch up to the rotational position of the first valve section such that the rotary valve is restored to a closed position. The hydraulic circuit is then closed and movement of the piston ceases. By joining multiple similar hydraulic actuators of this type to the same simultaneous transmission line then it is possible to obtain synchronised movements of the hydraulic actuators.

The purely mechanical connection of the prior art worm wheel and worm gear synchronisation systems is replaced by the rotary valve arrangement of the first aspect. This has advantages in that the magnitude of the force required by the synchronisation connection can be reduced and the forces fed back into the simultaneous transmission line from the hydraulic actuators can also be reduced. In addition, in the event that one hydraulic actuator of multiple hydraulic actuators in a multi-cylinder hydraulic actuator system becomes jammed and movement of the simultaneous transmission line is prevented then the force from the jam on the simultaneous transmission line is significantly reduced since all the operable hydraulic actuators will move to a position where the rotary valve is closed and the force from the jam on the simultaneous transmission line will be limited to the forces applied by the driving actuator or pilot torque. In contrast, with prior art systems such as the worm wheel and worm gear systems mentioned above then in the case of a single jammed actuator all other actuators in the system will apply their loads by the simultaneous transmission line. This can severely limit the number of actuators that can be synchronised together before additional safety mechanisms, such as torque limiters, are required.

Typically a rotation of the first valve section in one direction will open a first fluid flow path in order to extend an output member of the hydraulic actuator by moving the piston in a first direction, and a rotation of the first valve section in the other direction will open a second fluid flow path in order to retract the output member of the hydraulic actuator by moving the piston in a second direction. It will be appreciated that either a clockwise or anticlockwise rotation might prompt extension with the opposite rotation prompting retraction. The piston can be coupled to an output member in the form of a piston rod or similar, as is known in the art.

The synchronisation connection may be for receiving a rotational input from a simultaneous transmission line in the form of a rotating cable or shaft. In some examples a rotational movement of a simultaneous transmission line coupled to the hydraulic actuator via the synchronisation connection may directly rotate the first valve section to move it in the first direction or the second direction as required.

The second valve section is coupled to the piston such that movement of the piston results in movement of the second valve section to follow the first valve section. Thus, when the first valve section opens a hydraulic flow path to prompt movement of the piston then the second valve section will move in the same rotational direction as the first valve section. The coupling between the second valve section and piston may, in one example, include a screw shaft that rotates with movement of the piston. This may be achieved by means of a nut connected with the piston and held on a thread of the screw shaft. In this case movement of the piston will move the nut and cause rotation of the screw shaft. The screw shaft may be joined to the second valve section via gears, such as via a screw shaft bevel gear that meshes with a rotary valve bevel gear, wherein the rotary valve bevel gear is coupled to the second valve section. Optionally, the rotary valve bevel gear may be fitted around the second valve section and connected thereto so that no relative rotation is possible.

The rotary valve may include a resilient biasing mechanism between the first valve section and the second valve section. The resilient biasing mechanism may provide a torque acting to bias the relative position of the first valve section and the second valve section to a closed position. Thus, the rotary valve may be arranged such that in order to move the first valve section and open a fluid flow path of the hydraulic circuit then the torque of the resilient biasing mechanism must be overcome. In this way the resilient biasing mechanism can avoid undesirable and/or unintended movements of the hydraulic actuator in response to small forces applied via the synchronisation connection. Undesirable effects such as "flutter" can be avoided. In addition, the resilient biasing mechanism acts to urge the first valve section and/or the second valve section to move toward a closed position when there is no longer any force applied via the synchronisation connection. Thus, in the case of a hydraulic failure or jamming of an actuator within a multi-cylinder actuation system as discussed above then the resilient biasing mechanism can close the rotary valve and return the system to a state where the hydraulic flow paths are closed, which causes the cylinders to be hydraulically locked against external loads.

The biasing torque from the resilient biasing mechanism may be in the range 5-30 Nm, for example it may be about 20 Nm. This torque is carried by the simultaneous transmission line and it is preferred to have a relatively low torque to minimise the stiffness required for the simultaneous transmission line.

The resilient biasing mechanism may for example comprise a torsion bar arranged to apply a torque to react against rotational forces applied via the first valve section and/or the second valve section. The torsion bar may be pre-stressed in order to apply a torque to urge the valve sections toward the closed position. The use of a torsion bar in a rotary valve arrangement for hydraulically assisted actuation is known in technical fields unconnected with the present invention, such as in relation to power-assisted steering for road vehicles. Torsion bar arrangements known from these other technical fields may be adapted for use with hydraulic cylinder actuators in accordance with the first aspect.

In one example the first valve section and the second valve section are arranged concentrically. Where the resilient biasing mechanism is a torsion bar then the torsion bar may be placed at the centre of the concentric arrangement, inside the inner valve section of the two valve sections. The inner valve section may be the first valve section that rotates in response to the input from the simultaneous transmission line and the outer valve section may hence be the second valve section that is coupled to the piston and rotates due to movement of the piston. This allows for a compact arrangement, especially when bevel gearing is used to connect the piston to the second valve section the rotary valve bevel gear can be placed about outer surface of the second valve section with the first valve section being located concentrically within the second valve section.

The resilient biasing mechanism may be held within the two concentric valve sections via pins extending through slots provided in each of the valve sections. For example, with the use of a torsion bar then there may be a first pin or first set of pins connected to a first end of the torsion bar and extending through first slots in the valve sections and a second pin or second set of pins connected to a second end of the torsion bar and extending through second slots in the valve sections. The slots may extend around a part of the circumference of the valve sections in order to allow for relative rotational movement of the valve sections limited by the extent of the slots. When one valve section rotates relative to the other valve section then a maximum relative rotation will be reached at the point when a pin is trapped between a counter-clockwise end of one slot in one of the valve sections and a clockwise end of another slot in another of the valve sections. For example, the extent of the slots may allow for relative rotation with a maximum angle in the range 2° to 8°, such as a maximum relative rotation of about 5°. The rotary valve may be arranged such that it is closed when slots of the first valve section and the second valve section are aligned. It will be appreciated that if a torque is applied via the pins due to a pre-stress in the torsion bar then this will bear against the ends of the slots in both of the valve sections and will urge the slots into alignment.

The hydraulic cylinder and piston of the hydraulic actuator may have any suitable arrangement, and the hydraulic actuator may comprise fluid pathways for the hydraulic circuit of any suitable type. For example, there may be a connection between the rotary valve and a first cylinder chamber at a proximal end of the hydraulic cylinder, wherein supply of hydraulic fluid to the first cylinder chamber may move the piston toward a distal end of the cylinder in an extension direction. There may be a connection between the rotary valve and a second cylinder chamber at a distal end of the hydraulic cylinder, wherein supply of hydraulic fluid to the second cylinder chamber may move the piston towards the proximal end of the cylinder in a retraction direction. The connection between the rotary valve and the second cylinder chamber may be via a retract line of the hydraulic circuit. The hydraulic circuit may include a hydraulic supply line coupled to a hydraulic input of the rotary valve and a hydraulic return line for return of hydraulic fluid pushed out of the hydraulic cylinder during actuation. Advantageously, the synchronisation connection may be for coupling to a simultaneous transmission line that passes along the hydraulic return line. The hydraulic actuator may comprise a piston rod coupled to the piston for providing an output movement from the actuator.

The hydraulic actuator may be an aerospace actuator, such as a hydraulic actuator for actuation of an aircraft flight control surface.

The invention also extends to a multi-cylinder hydraulic actuator system comprising multiple hydraulic actuators as described above, with each of the multiple hydraulic actuators being linked via a simultaneous transmission line that is joined to or integral with the synchronisation connection. Such a multi-cylinder hydraulic actuator system achieves advantages over prior art systems synchronised via purely mechanical linkages as described above. The proposed hydraulic actuator uses the rotary valve to achieve hydraulic power assisted movement of the actuator prompted by input forces from the simultaneous transmission line, rather than using mechanical feedback via gears such as the worm wheel and worm gear to even out any differential movement in the hydraulic cylinders.

The multi-cylinder hydraulic actuator system may comprise multiple hydraulic actuators as describe above as slave cylinders as well as a master cylinder that receives a master input signal. In this case the movement of the master cylinder may cause an appropriate force to be applied to the synchronisation connections of the slave cylinders via the simultaneous transmission line in order that the slave cylinders are actuated in synchronisation with the master cylinder.

The multi-cylinder hydraulic actuator system may be an aircraft actuator system such as an aircraft flight control surface actuator system.

In a second aspect, the invention provides a method for controlling a hydraulic actuator, the hydraulic actuator comprising: a hydraulic cylinder; a piston within the hydraulic cylinder and movable in response to movement of hydraulic fluid in a hydraulic circuit coupled to the hydraulic cylinder; a synchronisation connection for receiving an input from a simultaneous transmission line; and a valve for controlling the flow of hydraulic fluid in the hydraulic circuit; wherein the valve is a rotary valve comprising a first valve section and a second valve section; wherein the method comprises rotating the first valve section in either a first rotational direction or a second rotational direction in response to input from the simultaneous transmission line in order to open a hydraulic flow path to the cylinder and urge the piston to move along the hydraulic cylinder in a corresponding first linear direction or second linear direction; and rotating the second valve section in the same rotational direction as the first valve section via a coupling between the second valve section and the piston, such that movement of the piston results in movement of the second valve section to follow the first valve section and to close the hydraulic flow path when the rotation of the first valve section is stopped.

The method of the second aspect may comprise using the hydraulic actuator of the first aspect and optionally using a hydraulic actuator with any of the other features discussed above. For example the method may include using a preloaded torsion bar as a resilient biasing mechanism to bias the relative position of the first valve section and the second valve section to a closed position. The torque of the pre-loaded torsion bar may be overcome by a torque applied using the simultaneous transmission line in order to rotate the first valve section to open the rotary valve.

BRIEF DESCRIPTION OF THE DRAWINGS

Certain preferred embodiments will now be descried by way of example only and with reference to the accompanying drawings, in which:

FIG. 3 is a perspective view of an inner valve section of FIG. 2;

FIG. 4 is a partially cut-away perspective view of an outer valve section of FIG. 2;

DETAILED DESCRIPTION

Figure 1:
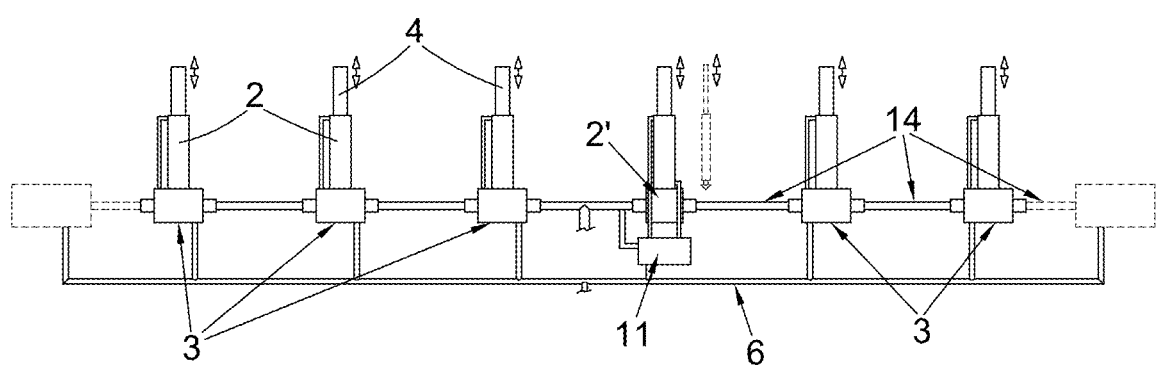
FIG. 1 shows a multi-cylinder hydraulic actuator system.

As shown in FIG. 1, a multi-cylinder hydraulic actuator system consists of multiple hydraulic actuators each having a hydraulic cylinder 2. In this example the hydraulic cylinders 2 include a master cylinder 2' as well as multiple slave cylinders 2, although it will be appreciated that in alternative arrangements the master cylinder 2' could be replaced by other driving and control means. With the use of a master cylinder 2' then movement of the master cylinder 2' is controlled, for example via a master control valve 11, and the slave cylinders 2 are actuated with synchronised movements to follow movement of the master cylinder 2'.

Each of the slave cylinders 2 is coupled to a rotary valve 3 for control of a hydraulic circuit to actuate the hydraulic actuator. Each of the rotary valves 3 is connected in series with the others via a simultaneous transmission line 14, which is used to synchronise the operation of the hydraulic actuators as described below. In this example the simultaneous transmission line 14 is a mechanical rotating shaft, such as a flexible shaft. Actuation of the hydraulic actuators moves a piston rod 4 in each case, and this would be connected to a device to be actuated, such as an aircraft flight control surface. It is advantageous to use an array of synchronised actuators for aircraft flight control surfaces.

Figure 2:
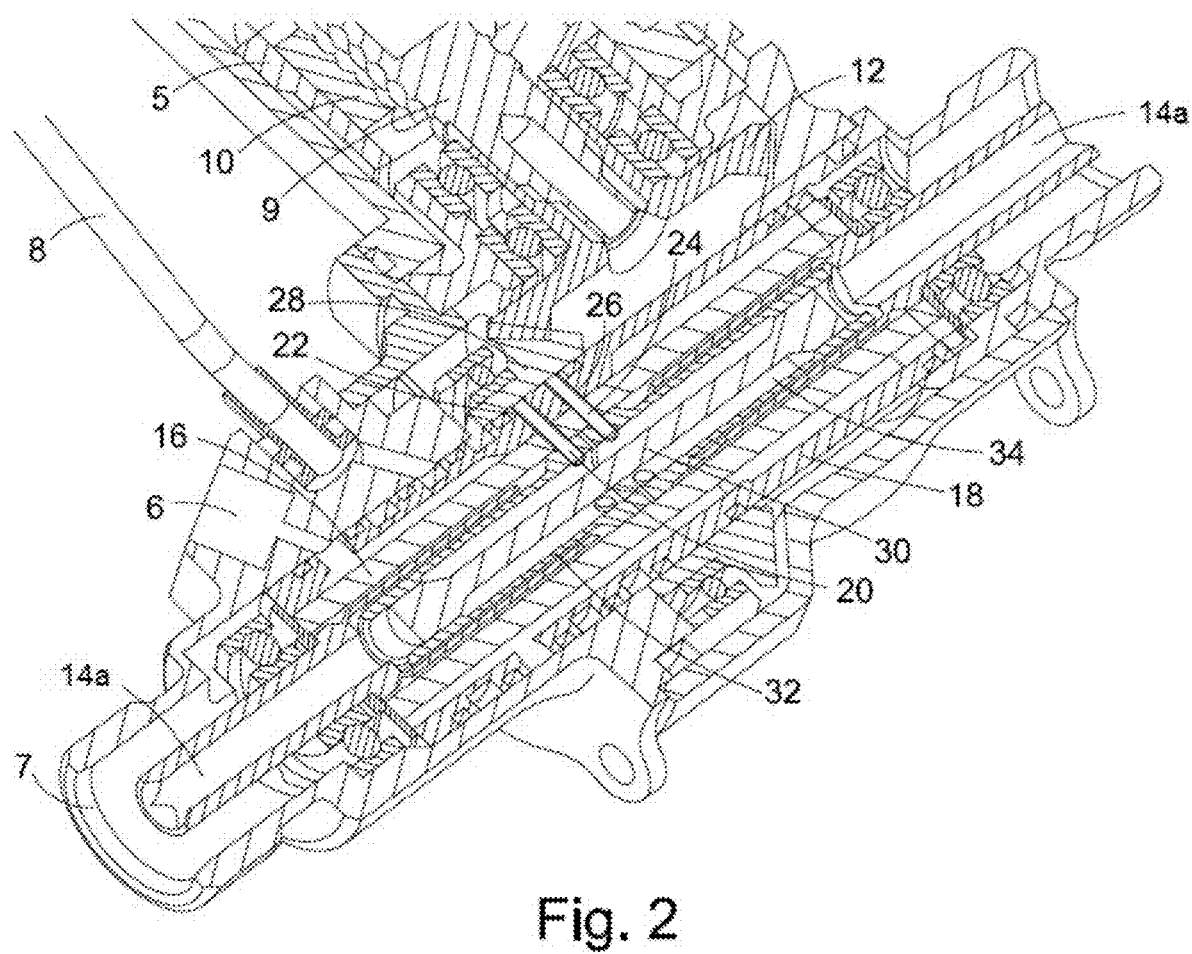
FIG. 2 is a cut-away perspective view of a hydraulic actuator and rotary valve arrangement for use with actuators of the actuator system of FIG. 1.

As can be seen in FIG. 2, each hydraulic cylinder 2 houses a piston 5 that is coupled to the piston rod 4. The piston 5 is moved due to hydraulic pressure applied by coupling a hydraulic circuit to chambers at either side of the piston 5. Extension of the piston rod 4 is enabled with increased hydraulic pressure at a first chamber, which is below the piston 5 in this example. Retraction of the piston rod 4 is enabled with increased hydraulic pressure in a second chamber, above the piston 5 in this example. A hydraulic circuit is controlled by the rotary valve 3 in order to couple a hydraulic supply line 6 to the first or the second chamber. A hydraulic return line 7 is provided to complete the hydraulic circuit. Advantageously, this hydraulic return line 7 also encloses the simultaneous transmission line 14.

In the case of extension of the piston rod 4, the hydraulic pressure is transmitted within the rotary valve 3 to a port that directs hydraulic fluid from the hydraulic supply line 6 to the first chamber of the cylinder 2, with lower pressure hydraulic fluid exiting the second chamber via the retract line 8 and being directed via the rotary valve 3 to the return line 7. In the case of retraction of the piston rod 4 the hydraulic pressure from the hydraulic supply line 6 is transmitted to the second chamber via the retract line 8, and lower pressure hydraulic fluid exits the first chamber and passes via the rotary valve 3 to the return line 7.

The hydraulic actuator further includes a screw shaft 9 that is coupled to a nut 10 which is fixed to the piston 5. Movement of the piston 5 will move the nut 10 along the screw shaft 9 and hence rotate the screw shaft 9. The screw shaft 9 is coupled to the mechanism of the rotary valve 3 in order to allow for interaction between the movement of the piston 5 and movement of the rotary valve 3, as well as to allow for transmission of torque to the screw shaft 9 via the rotary valve 3 in order to turn the screw shaft 9 and move the piston 5 in cases where there is no hydraulic pressure. For example, this may be useful in case of failure of the hydraulic system, or during maintenance operations. In this example the connection of the screw shaft 9 to the rotary valve 3 is via a screw shaft bevel gear 12 and a rotary valve bevel gear 28, as described in more detail below.

The rotary valve 3 has a housing attached to a housing of the hydraulic cylinder, and within the housing the rotary valve 3 includes: a first valve section, which in this example is an inner valve section 16; and a second valve section, which in this example is an outer valve section 18. The two valve sections rotate relative to one another clockwise or anti-clockwise in order to open and close the required ports to direct hydraulic fluid to extend or retract the piston 5 and thereby actuate the piston rod 4 as described above. One example for the geometry of the hydraulic flow paths for the inner valve section 16 and the outer valve section 18 is shown in the Figures and can in particular be seen in FIGS. 3 and 4. However, it will be appreciated that different geometries could be used for the hydraulic flow paths.

Rotation of the inner valve section 16 relative to the outer valve section 18 can be prompted by rotational input from the simultaneous transmission line 14, i.e. rotation of the shaft that extends from either end of the inner valve section 16 as shown in the Figures. The shaft acts as a synchronisation connection 14a for the rotary valve 3 and via the shaft the simultaneous transmission line 14 is coupled to the rotary valve inner section 16. The two ends of the shaft and the rotary valve inner section 16 all rotate together as one rigid body. The outer valve section 18 can also rotate within the housing of the rotary valve 3.

Figure 5:
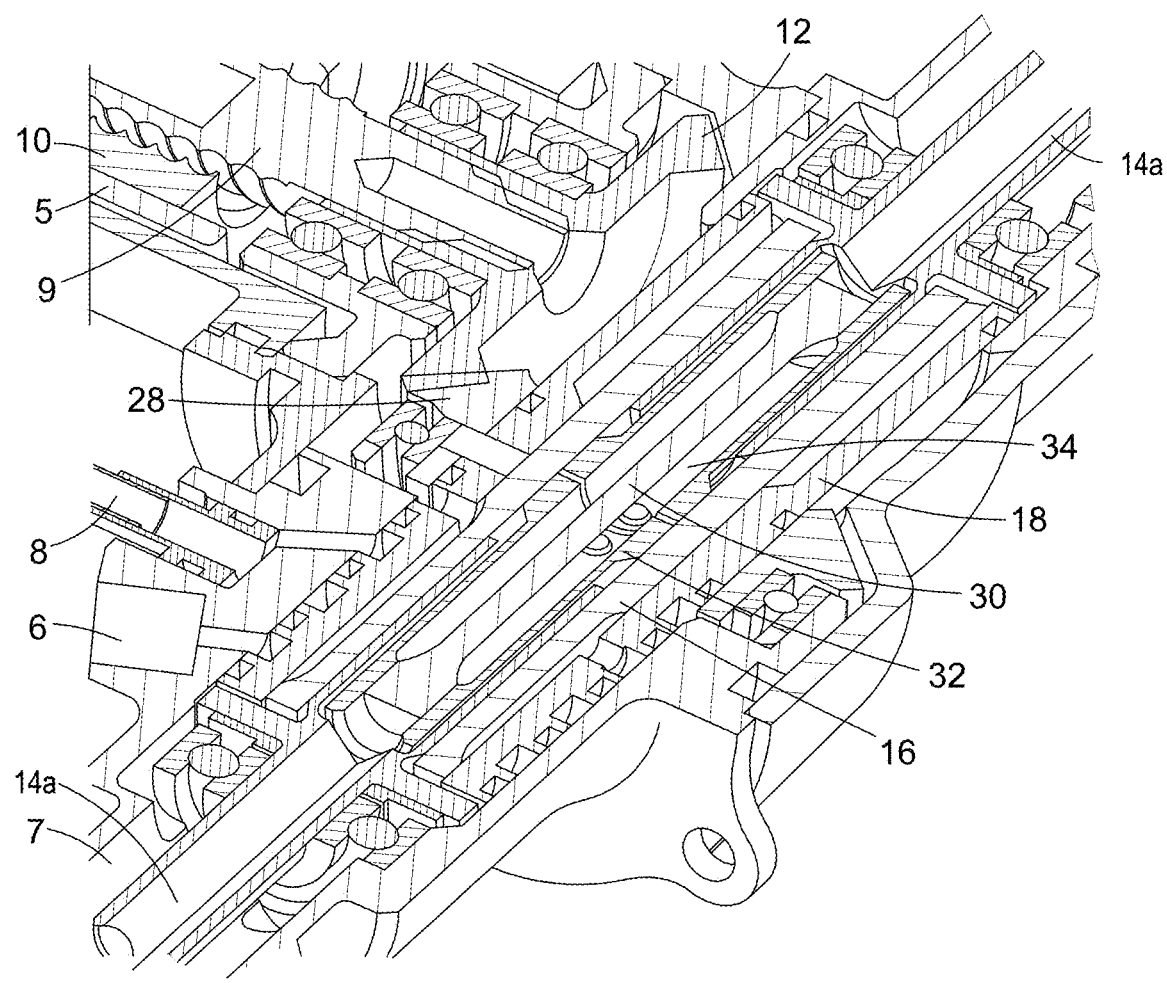
FIG. 5 is a cut-away perspective view of the rotary valve arrangement of FIG. 2, with valve sections rotated compared to FIG. 2.

Rotation of the outer valve section 18 is linked to movement of the piston 5 by the rotary valve bevel gear 28 as noted above. The rotary valve bevel gear 28 is fixed to the outer valve section 18, and in this example the bevel gear 28 is pinned to the outer valve section 18 as seen in FIG. 5, which shows the rotary valve sections 16, 18 slightly rotated compared to FIG. 2. With this arrangement any linear movement of the piston 5, which results in rotation of the screw shaft 9 via the nut 10, will occur in conjunction with rotational movement of the two bevel gears 12, 28 and hence rotation of the rotary valve outer section 18. This allows for interaction between the valve sections 6, 18, the hydraulic circuit, and actuation of the piston 5 in the hydraulic cylinder 2, in order that movement of the piston 5 is synchronised with rotation of the simultaneous transmission line 14. Effectively, the actuation of the piston 5 follows movement of the simultaneous transmission line 14 with "power assistance" from the hydraulic circuit. When the simultaneous transmission line 14 stops moving the valve inner section 16 then the valve outer section 18 continues to turn until the rotary valve 3 is returned to a closed position and the hydraulic circuit no longer moves the piston 5. When the hydraulic actuator is used within a multi-cylinder hydraulic actuator system as in FIG. 1 then since each hydraulic (slave) cylinder can be controlled via a similar rotary valve 3 coupled to the same simultaneous transmission line 14 then the result is synchronised hydraulic actuation for the whole array.

As seen in FIGS. 2-7 the rotary valve 3 also includes a torsion bar 30 that is pre-loaded with a torque in order to apply a resilient bias to the relative position of the first and second valve sections 16, 18. This means that the rotary valve 3 can be biased to a close position. In order for the valve to open the shaft of the simultaneous transmission line 14 must apply a torque to overcome the torque of the torsion bar 30. This prevents "flutter" and other undesirable behaviour of the rotary valve 3 in reaction to small and/or unintended loads on the shaft. In addition, it allows for equalisation of the positions of all of the hydraulic actuators once the input load on the simultaneous transmission line has been removed, and this can enhance the operation of the multi-cylinder hydraulic actuator system, especially in circumstances where one or more of the actuators has jammed or otherwise has suffered a failure that prevents movement of the piston 5.

In this example the torsion bar 30 is held within the inner valve section 16 and the outer valve section 18 and connected to them via an arrangement of pins and slots. A first set of pins 20 is joined to one end of the torsion bar 30 via a first torsion bar housing 32. These first pins 20 extend through first slots 22 in the inner valve section 16 and the outer valve section 18. A second set of pins 24 is joined to a second end of the torsion bar 30 via a second torsion bar housing 34. These second pins extend through second slots 26 in the inner valve section 16 and the outer valve section 18. The first pins 20 and the second pins 24 are free to move along their respective slots 22, 26, subject to overcoming the torque pre-loaded in the torsion bar 30. This creates potential for various interactions between rotations of the inner valve section 16 and the outer valve section 18 and hence interactions between rotations of the shaft and the bevel gear 28.

When the simultaneous transmission line 14 turns then torque is applied to the inner valve section 16 against the torque pre-loaded in the torsion bar 30 with a first end of one of the sets of slots 22, 26 in the first, inner, valve section 16 applying a force against one of the sets of pins 20, 24 and a second end of the other set of slots 22, 26 in the second, outer, valve section 18 applying a force against the other of the sets of pins 20, 24. With the hydraulic circuit closed then the outer valve section 18 will not readily move since it is held in place by the bevel gears 28, 12 connecting to the screw shaft 9 and hence to the piston 5. The torsion bar stiffness is relatively low and is insufficient to prompt rotation of the bevel gear 28 against the resistance of the hydraulic actuator. When the torque pre-loaded in the torsion bar 30 is overcome by the torque applied with the shaft then the torsion bar 30 is twisted with the inner valve section 16 rotating within the outer valve section 18 and the two sets of pins 20, 24 rotating relative to one another. This opens the hydraulic circuit for either extension or retraction (depending on the direction of rotation of the inner valve section 16) and the piston 5 therefore begins to move.

As described above, movement of the actuator piston 5 pulls the nut 10 along the screw thread of the screw shaft 9, which then turns the screw shaft 9 and hence turns the bevel gears 12, 28 in order to rotate the outer valve section 18. The rotation of the outer valve section 18 is in the same direction as the inner valve section 16 so that the outer valve section 18 'chases' the rotary valve inner section 16. When the movement of the simultaneous transmission line 14 and the rotary valve inner section 16 stops then the rotary valve outer section 18 continues to move and this then closes the valve 3. This movement is assisted to some degree by the torque pre-loaded in the torsion bar 30.

Figure 6:
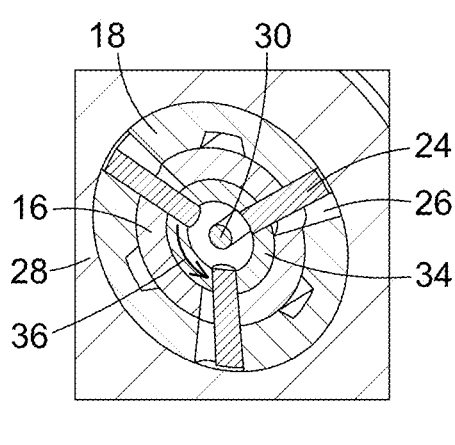
FIG. 6 is a cross-section through the rotary valve of FIG. 5 at a first set of torsion bar pins.
Figure 7:
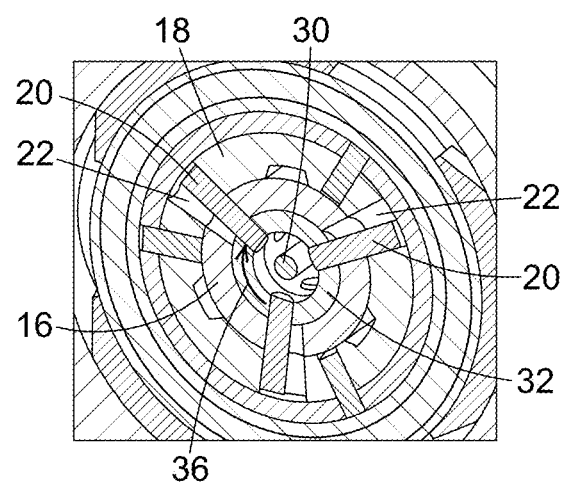
FIG. 7 is a cross-section through the rotary valve of FIG. 5 at a second set of torsion bar pins.

The cross-sections of FIGS. 6 and 7 show how torque 36 is applied via the pins 20, 24. FIG. 6 is a cross-section through the second pins 24 with the rotary valve 3 in the position shown in FIG. 5. The second pins 24, which extend through the second slots 26, are urged counter-clockwise 36 by the pre-loading of the torsion bar 30, which is linked to the second pins 24 via the second torsion bar housing 34. FIG. 7 is a cross-section through the first pins 20 with the rotary valve 3 in the same position, as shown in FIG. 5. The first pins 20, which extend through the first slots 22, are urged clockwise 36 by the pre-loading of the torsion bar 30, which is linked to the first pins 20 via the first torsion bar housing 32. With no load applied from the synchronisation 14a (i.e. the shaft linking to the simultaneous transmission line 14 in the embodiment) then the rotary valve is at rest with the slots 22, 26 of the first and second valve sections 16, 18 aligned. The inner valve section 16 receives a torque from the synchronisation connection 14a, which may act clockwise or counter-clockwise depending on the direction of movement required for the piston 5. If the inner valve section 16 receives a clockwise torque then this will bear against the second pins 24 opposing the pre-load torque 36 shown in FIG. 6, and when the pre-loading of the torsion bar 30 is overcome then the inner valve section 16 will rotate relative to the outer valve section 18 with the maximum rotation being determined by the extent of the slots 26. The rotation opens the hydraulic circuit and movement of the hydraulic actuator then proceeds as above. If the inner valve section 16 receives a counter-clockwise torque then this will bear against the first pins 20 opposing the preload torque 36 shown in FIG. 7, and when the pre-loading of the torsion bar 30 is overcome then the inner valve section 16 will rotate counter-clockwise relative to the outer valve section 18 with the maximum rotation being determined by the extent of the slots 22. Again, this relative rotation opens the hydraulic circuit and movement of the hydraulic actuator then proceeds as above.

If the hydraulics as a whole were to fail for some reason then the actuator may still be moved by applying torque to the simultaneous transmission line 14 and the rotary valve inner section 16 to overcome the torque of the torsion bar and rotate the rotary valve inner section 16 to apply torque directly to the bevel gear 28 and via the gearing 12, 28 to the screw shaft 9. If there is no hydraulic supply then once the valve is opened enough to allow flow of hydraulic fluid into and out of the hydraulic cylinder (i.e. to release the hydraulic lock) then the simultaneous transmission line 14 will be able to relatively easily rotate the screw shaft 9. Thus, with an appropriate mechanism to apply torque, and a suitable system to release the hydraulic pressure and allow movement of the piston 5 then the simultaneous transmission line 14 can be used to extend or retract the piston 5. For example, in the case of a multi-cylinder hydraulic actuator system used for a flight control surface of an aircraft then this may be used to reset the system on the ground or to revert to a safe state in the air.

In the event of failure of one of the cylinders 2 leading to jamming then when it is attempted to begin the simultaneous movement the simultaneous transmission line 14 and the rotary valve inner section 16 are rotated as above. For each rotary valve 3 coupled to the simultaneous transmission line this results in movement of the inner valve section 16 relative to the outer valve section 18 in order to open the valve 3 and allow hydraulic fluid to flow. Each piston 5 is then driven to move. However, if one piston is jammed and cannot move then this will stop the rotation of the simultaneous transmission line 14. The non-jammed pistons 5 will continue to move, but only by the amount required to close their respective rotary valves 3. Whilst torque continues to be applied to the simultaneous transmission line 14 then the rotary valve 3 of the jammed actuator remains open and the hydraulic circuit is open only for the jammed actuator. The torque in the simultaneous transmission line 14 is limited to be only the torque applied to the simultaneous transmission line 14 and there is no additional force applied by the unjammed actuators as can be the case with prior art synchronised hydraulic actuators. The amount of differential movement of the hydraulic pistons is limited to the movement required to close the rotary valves 3 of the unjammed actuators, which minimises the strain placed on the actuated system.

When the torque on the simultaneous transmission line 14 is released then the jammed actuator will likely not move, but control system for the simultaneous transmission line 14, and/or the torque of the torsion bars 30 will be able to prompt a small rotation of the simultaneous transmission line 14 to return the rotary valve 3 of the jammed cylinder to the closed position, whilst also prompting a small hydraulically assisted movement of all of the non-jammed cylinders to ensure that all of the actuators are in the correct synchronisation with the position of the jammed cylinder. As a consequence there is no strain on the system when the simultaneous transmission line 14 is released.

The hydraulic actuator described herein is used for hydraulic assisted actuation and has advantages in a multi-cylinder hydraulic actuator system as will be apparent from the discussion above. A multi-cylinder hydraulic actuator system including a plurality of such hydraulic actuators coupled via the rotary valves 3 with a simultaneous transmission line 14 may be used for aircraft flight control surfaces or for actuation of other aircraft component requiring an array of synchronised actuators.

The invention claimed is:

1. An aircraft actuator system comprising:
   an aircraft flight control surface; and
   a multi-cylinder hydraulic actuator system for actuation of the aircraft flight control surface comprising multiple hydraulic actuators, with each of the multiple hydraulic actuators being linked with others of the multiple hydraulic actuators via a simultaneous transmission line, each of the multiple hydraulic actuators comprising:
   a hydraulic cylinder;
   a piston within the hydraulic cylinder and movable in response to movement of hydraulic fluid in a hydraulic circuit coupled to the hydraulic cylinder;
   a synchronisation connection that is joined to or integral with the simultaneous transmission line and is for receiving an input from the simultaneous transmission line; and
   a valve for controlling the flow of hydraulic fluid in the hydraulic circuit;
   wherein the valve is a rotary valve comprising:
   a first valve section arranged to rotate in either a first rotational direction or a second rotational direction in response to input from the simultaneous transmission line in order to open a hydraulic flow path to the cylinder and urge the piston to move along the hydraulic cylinder in a corresponding first linear direction or second linear direction; and a second valve section arranged to rotate in either the first rotational direction or the second rotational direction;

wherein the second valve section is coupled to the piston such that movement of the piston results in movement of the second valve section to follow the first valve section and to close the hydraulic flow path when the rotation of the first valve section is stopped; and wherein the rotary valve includes a resilient biasing mechanism between the first valve section and the second valve section, wherein the resilient biasing mechanism provides a torque acting to bias the relative position of the first valve section and the second valve section to a closed position.

2. The aircraft actuator system as claimed in claim 1, wherein the synchronisation connection is for receiving a rotational input from the simultaneous transmission line in order to rotate the first valve section to move the first valve section in the first rotational direction or the second rotational direction as required.

3. The aircraft actuator system as claimed in claim 1, wherein the resilient biasing mechanism comprises a torsion bar arranged to apply a torque to react against rotational forces applied via the first valve section and/or the second valve section, wherein the torsion bar is pre-stressed in order to apply a torque to urge the valve sections toward the closed position.

4. The aircraft actuator system as claimed in claim 3, wherein the first valve section and the second valve section are arranged concentrically and the torsion bar is placed at the centre of the concentric arrangement, inside an inner valve section of the two valve sections.

5. The aircraft actuator system as claimed in claim 4, wherein the inner valve section is the first valve section that rotates in response to the input from the simultaneous transmission line and an outer valve section in the concentric arrangement is hence the second valve section that is coupled to the piston and rotates due to movement of the piston.

6. The aircraft actuator system as claimed in claim 4, wherein the torsion bar is held within the two concentric valve sections via pins extending through slots provided in each of the valve sections.

7. The aircraft actuator system as claimed in claim 6, wherein the pins comprise a first pin or first set of pins connected to a first end of the torsion bar and extending through first slots in the valve sections and a second pin or second set of pins connected to a second end of the torsion bar and extending through second slots in the valve sections; wherein the slots extend around a part of the circumference of the valve sections in order to allow for relative rotational movement of the valve sections in accordance with the extent of the slots.

8. The aircraft actuator system as claimed in claim 6, wherein the rotary valve is arranged such that the rotary valve is closed when slots of the first valve section and the second valve section are aligned.

9. The aircraft actuator system as claimed in claim 1, wherein the second valve section is coupled to the piston by a coupling that includes a screw shaft that rotates with movement of the piston and a nut connected with the piston and held on a thread of the screw shaft.

10. The aircraft actuator system as claimed in claim 9, wherein the screw shaft is joined to the second valve section via gears.

11. A method for controlling an aircraft actuator system comprising an aircraft flight control surface and a multi-cylinder hydraulic actuator system for actuation of the aircraft flight control surface comprising multiple hydraulic actuators, each of the multiple hydraulic actuators being linked to others of the multiple hydraulic actuators via a simultaneous transmission line, each of the multiple hydraulic actuators comprising: a hydraulic cylinder; a piston within the hydraulic cylinder and movable in response to movement of hydraulic fluid in a hydraulic circuit coupled to the hydraulic cylinder; a synchronisation connection that is joined to or integral with the simultaneous transmission line and is for receiving an input from the simultaneous transmission line; and a valve for controlling the flow of hydraulic fluid in the hydraulic circuit;

wherein the valve is a rotary valve comprising a first valve section and a second valve section wherein the rotary valve includes a resilient biasing mechanism between the first valve section and the second valve section, wherein the resilient biasing mechanism provides a torque acting to bias the relative position of the first valve section and the second valve section to a closed position;

wherein the method comprises:

rotating the first valve section in either a first rotational direction or a second rotational direction in response to input from the simultaneous transmission line in order to open a hydraulic flow path to the cylinder and urge the piston to move along the hydraulic cylinder in a corresponding first linear direction or second linear direction; and rotating the second valve section in the same rotational direction as the first valve section via a coupling between the second valve section and the piston, such that movement of the piston results in movement of the second valve section to follow the first valve section and to close the hydraulic flow path when the rotation of the first valve section is stopped.

* * * * *